United States Patent
Dong (10) Patent No.: US 11,860,843 B2
(45) Date of Patent: Jan. 2, 2024

(54) DATA PROCESSING METHOD AND DEVICE

(71) Applicant: Futian Dong, Jiangsu (CN)

(72) Inventor: Futian Dong, Jiangsu (CN)

( * ) Notice: Subject to any disclaimer, the term of this patent is extended or adjusted under 35 U.S.C. 154(b) by 532 days.

(21) Appl. No.: 16/965,278

(22) PCT Filed: Jan. 30, 2019

(86) PCT No.: PCT/CN2019/073814
§ 371 (c)(1),
(2) Date: Jul. 27, 2020

(87) PCT Pub. No.: WO2019/149204
PCT Pub. Date: Aug. 8, 2019

(65) Prior Publication Data
US 2021/0073194 A1    Mar. 11, 2021

(30) Foreign Application Priority Data

Feb. 1, 2018    (CN) .......................... 201810101953.5

(51) Int. Cl.
*G06F 16/00*    (2019.01)
*G06F 16/22*    (2019.01)

(52) U.S. Cl.
CPC ................................ *G06F 16/2228* (2019.01)

(58) Field of Classification Search
CPC .. G06F 16/215; G06F 16/285; G06F 16/2228; G06N 20/00; G06N 5/04
USPC ...................................................... 707/741
See application file for complete search history.

(56) References Cited

U.S. PATENT DOCUMENTS

| | | | |
|---|---|---|---|
| 6,137,914 A | 10/2000 | Ligtenberg et al. | |
| 2009/0063424 A1 | 3/2009 | Iwamura et al. | |
| 2010/0049704 A1 | 2/2010 | Sumiya | |
| 2014/0108074 A1* | 4/2014 | Miller | G06Q 10/063 705/7.11 |
| 2016/0259826 A1* | 9/2016 | Acar | G06F 16/9535 707/707 |

(Continued)

FOREIGN PATENT DOCUMENTS

| | | |
|---|---|---|
| CN | 102682083 A | 9/2012 |
| CN | 105808756 A | 7/2016 |

(Continued)

OTHER PUBLICATIONS

Office Action for Japanese Patent Application No. 2020-541650 (dated Jun. 2, 2022).

(Continued)

*Primary Examiner* — Alexandria Y Bromell
(74) *Attorney, Agent, or Firm* — Merchant & Gould P.C.

(57) ABSTRACT

Disclosed are a data processing method and device, the method including: setting the scale of data; analyzing and computing a correlation between the data according to the scale of the data; and processing the data on the basis of the correlation according to a processing method corresponding to a set processing type. According to different processing types, disclosed are: a data management and storage method; a method for establishing indexes and analyzing management data; a method for managing and storing data on the basis of indexes; a method for displaying data; a method for analyzing and computing data; and a method for progressive transmission of data.

19 Claims, 5 Drawing Sheets

(56) References Cited

U.S. PATENT DOCUMENTS

2017/0371883 A1* 12/2017 Bailiang ............... G06F 16/904
    707/707

FOREIGN PATENT DOCUMENTS

| JP | 2000-510616 A | 8/2000 |
|----|---------------|--------|
| JP | 2004-028846 A | 1/2004 |
| JP | 2009-058252 A | 3/2009 |
| JP | 4352156 B1 | 10/2009 |
| JP | 2010-128806 A | 6/2010 |
| JP | 4491070 B2 | 6/2010 |
| JP | 2010-210846 A | 9/2010 |
| JP | 2017-032654 A | 2/2017 |

OTHER PUBLICATIONS

International Search Report for PCT/CN2019/073814, dated Apr. 28, 2019.
Office Action for Japanese Patent Application No. 2020-541650 (dated Sep. 29, 2021).

* cited by examiner

DATA PROCESSING METHOD AND DEVICE

The present application is the national phase of International Application No. PCT/CN2019/073814, titled "DATA PROCESSING METHOD AND DEVICE", filed on Jan. 30, 2019, which claims priority to Chinese Patent Application No. 201810101953.5, titled "METHOD AND APPARATUS FOR PROCESSING DATA", filed on Feb. 1, 2018 with the China National Intellectual Property Administration (CNIPA), which is incorporated herein by reference in its entirety.

TECHNICAL FIELD

The present disclosure relates to the fields of spatial information technology, computer graphics, virtual reality technology, and computer operating system, and in particular to a method and an apparatus for processing data.

BACKGROUND

Macro and micro are concepts that correspond to each other and are usually expressed in term of scale. The scale of data includes an intrinsic scale which is objectively existed and a non-intrinsic scale which is subjectively set. For example, geographic research on micro and macro of an object is based on a geographic intrinsic space-time scale, and geographic research on micro and macro of visual field is based on a geographic non-intrinsic space-time scale. In GIS, spatial data reflects intrinsic macro and micro which are objectively existed, and display of an electronic map and spatial analysis and calculation reflect non-intrinsic macro and micro which are subjectively set. With a method in the conventional technology, the problem of unification between the objectively existing intrinsic scale and the subjectively set non-intrinsic scale, in terms of data organization, storage, indexing, and analysis and spatial relationship calculation cannot be solved. For example, the problem of opposition and unity between a map and data, between a map and a coordinate point of data, and even between a map and a data bit of an coordinate point cannot be solved with the method in the conventional technology, since it is required different data, a different coordinate point of the data, and a different data bit of the coordinate point for a map with a different scale. In order to solve the pressure caused by massive spatial data on server, transmission and display, it has pre-process the spatial data by a server, to render into a map image in a specific thematic style. Then the map is cut into different levels of raster images based on a grid having a pyramid structure. A slice at each level is encoded, to determine a unique index value of the slice. When the client browses spatial data by zooming in and out, the client can directly calculate an index value of a slice based on coordinates within the current display range and according to a slice index standard, and send the calculated index value of the slice to the server, then the server transmits slice data corresponding to the index value to the client for displaying. In this way, although partial unification between the objectively existing intrinsic scale and the subjectively set non-intrinsic scale is solved during map display, and the performance bottleneck of the map display is solved, other functions of the system cannot be realized, but resulting in more and new bottlenecks.

Resolution refers to an ability of a measurement or display system to identify details. A definition on resolution approved and issued by the China National Committee for Terms in Sciences and Technologies is that the ability to identify details of a physical quantity.

With the progress of science and technology, as well as the rapid development and wide application of space technology, application fields based on spatial entities, such as computer graphics, virtual reality, urban planning, restoration of cultural relics, animation games, computer-aided design, geographic information system, and medical graphics, has developed rapidly, and data is exploding. The compression, transmission, display, and analysis of massive data have become the main technical bottlenecks restricting the development of these industries.

From the perspective of data display on a screen, the scale of the screen and the scale of the pixels are limited. When data is displayed on pixels of an electronic screen, the number of pixels that can be seen is limited, and each of pixels can only display a piece of data at a certain time. That is to say, the maximum amount of data that can be displayed on a screen is constant, which is irrelevant to how infinite the data is but only related to the resolution of the screen.

(1) With regard to drawing, it is only to draw the data that can be finally seen, solving the contradiction between display efficiency and the amount of data.

(2) With regard to transmission, it is only to transmit the data to a front terminal via a network, solving the contradiction between network bandwidth and the amount of data.

(3) With regard to reading, it is only to read these data, and these data are centrally stored in a file, solving the pressure of disk reading.

(4) With regard to query, the key for only reading these data is to only find these data with an index, and the query and retrieval is performed by the client oneself requesting data based on the index. The data is stored in a distributed mode at a server based on an index item of the index, and the client retrieves a data block in a data file to be read with the index, without causing pressure on the server in querying data. In addition, the data amount of indexes should be small enough and cannot increase proportionally with the amount of data. If the data amount of the indexes increases to a certain amount, network transmission of the indexes is a bottleneck.

All problems can be unified into an index problem. If the index problem is solved, other bottleneck problems are solved. The problem to be solved by an index is that, how to have all advantages of a slice index, and data is separated based on a spatial relationship so as to be stored in a distributed mode, rather than splitting data and then storing the data in a distributed mode. With the index, the unification of simplicity and complexity is realized. That is, the organization, management, storage, query, transmission, display and analysis of arbitrarily complex spatial data can be realized with a simple index relationship.

With the index, the non-intrinsic scale and the intrinsic scale are unified, the performance problems when a user views part data and whole data, macro data and micro data at different scales (non-intrinsic scales), and analyzes and calculates the data at different scales, such as reading, transmission, display, analysis and calculation on data, are solved. The contradiction between finite and infinite is solved, that is, the intrinsic scale of data is in harmony with the subjective set non-intrinsic scale. The unification of the subjectively set non-intrinsic scale and the intrinsic scale of the data can be reflected by data in a macro data set, and also by data in a data bit which is a smallest unit to constitute data.

With the index, the unification of simplicity and complexity of the spatial relationship between the data is realized based on the scale, and the problems of function (the problem of whether the function can be realized,) and performance of storage, reading, and analysis and calculation of data are solved, where the problem of function refers to whether a function can be realized, for example, realization of separating data to store, instead of splitting data to store in the conventional technology. The spatial relationship between data at different scales is simple or complex. For example, the spatial relationship between data at a large scale is simple and is only required to consider coincidence or non-coincidence, and then it is determined which data is placed in an index item of the index, to establish a sub-index for management; while the spatial relationship between data at a small scale presents a complex spatial relationship such as an inclusion relationship, an intersection relationship, and a tangency relationship, and the data may be placed in an data item of the index so as to be managed directly without establishing a sub-index. Different data items in the index, serving as data blocks for data management and data records and files for database management, are stored in various storage devices such as a memory and a hard disk.

With the index, data at different scales are unified for query, management, storage, analysis and calculation, based on the scale. All forms of data, such as a macro data set, data describing an object (such as surface data), coordinate data (such as coordinate points constituting surface data), and a micro data bit (such as data on each bit constituting the coordinate data), are unified for management, analysis and calculation, based on different scales in the index.

SUMMARY

In view of the above, a method and an apparatus for processing data are provided in the present disclosure. The specific solutions are as follows.

A method for processing data, includes:
setting a scale of data;
analyzing and calculating a relationship between the data, based on the scale of the data; and
processing the data based on the relationship, with a processing method corresponding to a set processing type.

In an embodiment, the data includes any one or a combination of a macro data set, data describing an object, coordinate data, or a micro data bit;

The scale of the data is a variable representing macro and micro of the data. Data at a large scale is more macroscopic than data at a small scale, while data at a small scale is more microscopic than data at a large scale.

In an embodiment, the scale of the data includes a spatial scale of the data itself or a time scale of the data itself.

In an embodiment, the scale of the data includes a scale of observed data or a scale of spatial data. The scale of the observed data includes a magnification ratio of the spatial data when the spatial data is displayed on a computer. The scale of the spatial data includes a resolution of the spatial data.

In an embodiment, the set scale of the data includes a preset scale, a temporarily set scale, or a calculated scale during data processing.

In an embodiment, the relationship between the data includes any one or a combination of a spatial relationship, a time relationship, and a scale relationship.

In an embodiment, the processing the data based on the relationship with a processing method corresponding to a set processing type includes:

The processing the data based on the relationship includes:

Establishing an index of data, storing data, reading data, transmitting data, displaying data, and analyzing data based on a relationship between data at a different scale; or Storing an index of the data, reading data, transmitting data, displaying data, and analyzing data based on different scales and the relationship between the data.

A method for establishing an index and analyzing and managing data, includes:
setting a scale of data;
analyzing and calculating a relationship between the data, based on the scale of the data; and
processing the data based on the relationship, with a processing method corresponding to a set processing type, where the processing step includes: establishing an index, and analyzing and managing the data, based on the analyzed and calculated relationship between the data.

In an embodiment, the set scale of the data includes a preset scale, a temporarily set scale, or a calculated scale in data processing, where the method further includes:
determining a level of the index based on the set scale of the data; and
managing and retrieving the data based on the determined level of the index.

In an embodiment, the establishing an index and analyzing and managing the data based on the analyzed and calculated relationship between the data includes:
continuously establishing a next level of the index for data meeting a preset index establishment condition and meeting a relationship between indexed data; and
not establishing a next level of the index for data not meeting the preset index establishment condition and not meeting the relationship between indexed data.

In an embodiment, a process of determining to set the index establishment condition based on a specific situation includes:
cases of determining to set an index establishment condition include: a case of setting a condition and a case of not setting a condition. For example, it may not set the index establishment condition in establishing an index for data in each of data bits constituting coordinate data.

In an embodiment, the preset index establishment condition includes: one or a combination of a preset range of data, a preset amount of data, and a preset quantity of data.

In an embodiment, the range of data includes: a range of the data itself or a range calculated based on the set scale of the data.

In an embodiment, the establishing an index and analyzing and managing the data based on the analyzed and calculated relationship between the data includes:
continuously establishing a next level of an index for data meeting the index establishment condition and meeting the relationship between indexed data, and managing the next level of the index with an index item for index management in the index, where a managed index can be retrieved with the index item for index management; and
managing the data not meeting the index establishment condition and not meeting the relationship between indexed data, with an index item for data management in the index, where data can be retrieved with the index item for data management.

In an embodiment, the establishing an index and analyzing and managing the data based on the analyzed and calculated relationship between the data includes:
  continuously establishing a next level of an index for data which meets the index establishment condition and between which the relationship analyzed and calculated based on the set scale of the data is coincidence;
  the next level of the index corresponds to a scale of data at a next level; and
  the scale of data at the next level is set with a direct or an indirect algorithm such as calculation based on a scale of a current level, and external assignment.

In an embodiment, the establishing an index and analyzing and managing the data based on the analyzed and calculated relationship between the data includes:
  continuously establishing a next level of an index for data which meets the index establishment condition and of which coordinate points constituting spatial data coincide into one point in analysis and calculation based on the set scale of the data.

In an embodiment, a process of the method for establishing an index and analyzing and managing data includes:
  establishing a unified index for any one or a combination of data in a data set, data describing or expressing an object, and data in a micro data bit, based on the set scale of the data; and
  using the unified index for data analysis and management, where the data analysis and management includes any one or a combination of storage, query, reading, transmission, display, analysis, and spatial relationship calculation of data.

A method for managing and storing data, includes:
  managing and storing data based on an established index, where the index is established with the method for establishing an index and analyzing and managing data described above.

In an embodiment, the managing and storing data based on an established index includes:
  using an index item for data management in the index as an object for managing and storing data, and performing data management and storage on the object for managing and storing data in a form of storing a data block, storing a record, or storing a file.

A method for managing and storing data, includes:
  setting a scale of data;
  analyzing and calculating a relationship between the data based on the scale of the data; and
  managing and storing the data, based on the analyzed and calculated relationship between the data.

In an embodiment, the setting a scale of data includes:
  setting an initial scale for data management, based on simplicity of a relationship between data at different scales.

In an embodiment, the setting a scale of data includes:
  setting a scale at which the data is coincident to be the initial scale for data management;
  coincidence of data includes: all data forms one coincidence, data forms multiple coincidences, or multiple coordinate points of one piece of data forms a coincidence.

In an embodiment, the managing and storing data based on the analyzed and calculated relationship between the data includes:
  using data between which the relationship is coincidence as a data management unit;
  setting a new scale of the data based on the initial scale for data management;
  analyzing and calculating a relationship between the data based on the new scale of the data, and using the data as a data storage unit at the new scale if the relationship between the data is not just coincidence; and
  using data, which meets a data management condition and between which a relationship is still coincidence, as a data management unit at the new scale of the data, and setting another new scale of the data and repeating the above process.
  the data management condition includes one or a combination of a quantity of data, an amount of data, and a range of data;
  the range of data includes a display range of the data at the new scale.

A method for displaying data, includes:
  determining a scale of data based on a scale of displayed data;
  retrieving to-be-displayed data with an index of the data based on the scale of the data, where the index of the data is established with the method for establishing an index and analyzing and managing data described above; and
  reading the to-be-displayed data for data displaying.

In an embodiment, the determining a scale of data based on a scale of displayed data includes:
  directly determining the scale of the displayed data as the scale of the data, or calculating the scale of the data based on the scale of the displayed data.

In an embodiment, the retrieving to-be-displayed data with an index of the data based on the scale of the data includes any one or a combination of the following ways:
  using a retrieved index item for index management as the displayed data for displaying;
  using part of data corresponding to the scale of the data in retrieved data as the displayed data for displaying;
  using data in part of data bits corresponding to the scale of the data in the retrieved data as the displayed data for displaying;
  using the retrieved data as the displayed data for displaying; and
  using one or more pieces of the retrieved data to replace other data having a relationship of coincidence as the displayed data for displaying.

A method for analyzing and calculating data, includes:
  making an analysis and calculation based on an index of data, where the index of the data is established with the method for establishing an index and analyzing and managing data described above; and
  making an analysis and calculation based on data at different scales in the data.

In an embodiment, the analysis and calculation includes an analysis and calculation related to a scale, or an analysis and calculation unrelated to a scale, and
  the analysis and calculation includes spatial relationship calculation, aggregation analysis, and thermal map analysis on data.

In an embodiment, the making an analysis and calculation includes: performing the analysis and calculation related to the scale based on an index and data corresponding to the scale.

In an embodiment, the performing an analysis and calculation based on an index of data includes:
  performing the analysis and calculation based on a spatial relationship of index data at different scales in the index of the data.

In an embodiment, the performing an analysis and calculation based on an index of data includes:

determining that there certainly has a certain spatial relationship between data or there might have a certain spatial relationship between data, by performing analysis and calculation based on the index.

In an embodiment, the performing an analysis and calculation based on data at different scales in the data includes:
performing an analysis and calculation based on data at different scales in the data, firstly performing an analysis and calculation by using data at a certain scale corresponding to a small amount of data and a small amount of calculation; and if it is required for performing the analysis and calculation that there is a certain relationship between data, then if a result obtained by performing analysis and calculation based on data at a certain scale corresponding to a small amount of data and a small amount of calculation includes a case that there might have the certain relationship, it is required to use more data at a certain scale in the data which might have the certain relationship, to perform a further analysis and calculation, until it is analyzed and calculated that there certainly has a certain spatial relationship between data.

In an embodiment, the performing an analysis and calculation includes:
the analysis and calculation including, but being not limited to, performing the analysis and calculation by one or more of multiple parts of a system such as a client and a server.

In an embodiment, the performing an analysis and calculation includes:
the analysis and calculation including, but being not limited to, performing the analysis and calculation based on an index and data at a macro scale at a non-data server such as a client part and an edge part of a system, and performing the analysis and calculation based on data at a micro scale and original data at a data storage terminal and a data service terminal.

A method for progressively transmitting data, includes:
sending an incremental data request if it is required to request incremental data, where the request includes a requested scale parameter; and
receiving incremental data obtained based on the requested scale parameter, including:
receiving incremental data obtained by performing an analysis based on the requested scale parameter and a scale of an index, where the incremental data is incremental data of the index;
and/or,
receiving incremental data obtained by performing an analysis based on the requested scale parameter and a scale of data, where the incremental data is incremental data of the data;
where the index is established with the method for establishing an index and analyzing and managing data described above.

In an embodiment, in a case that a request sender caches previously cached data, the previously cached data includes index data corresponding to a scale in a previously cached index, and/or data corresponding to a scale in the previously cached data.

In an embodiment, the method for progressively transmitting data, in the case that the request sender caches the previously cached data, includes:
determining a current scale parameter;
obtaining a highest-level scale parameter corresponding to the previously cached data;
determining a relationship between the highest-level scale parameter corresponding to the previously cached data and the current scale parameter to determine whether it is required to request data, continuing to perform subsequent steps if it is required to request data, or ending the process if it is unnecessary to request data;
sending the incremental data request, where the request includes the current scale parameter and the highest-level scale parameter corresponding to the previously cached data, which are referred as the requested scale parameter;
receiving the incremental data obtained by performing an analysis based on the requested scale parameter and a scale parameter of the index, where the incremental data is the incremental data of the index;
receiving the incremental data obtained by performing an analysis based on the requested scale parameter and a scale parameter of the data, where the incremental data is the incremental data of the data; and
inserting the received incremental data into the previously cached data.

In an embodiment, determining the scale parameter includes:
an index item in the index, which manages finer and more microscopic data, corresponds to a higher level of the scale parameter; and
data having a higher resolution and finer data correspond to a higher level of the scale parameter.

A method for progressively transmitting data, includes:
receiving an incremental data request sent from a request sender, where the incremental data request includes a requested scale parameter;
obtaining incremental data corresponding to the incremental data request, based on the request scale parameter, including:
performing an analysis based on the requested scale parameter and a scale of an index, to determine index data meeting an incremental condition in the index as the incremental data; and/or performing an analysis based on the requested scale parameter and a scale of data, to determine data meeting the incremental condition in the data as the incremental data; and
sending the incremental data to the request sender;
where the index is established with the method for establishing an index and analyzing and managing data described above.

In an embodiment, in a case that the request sender stores a previously cached index and previously cached data, the requested scale parameter includes at least one of a current scale parameter and a scale parameter corresponding to the previously cached data.

In an embodiment, the obtaining incremental data corresponding to the incremental data request includes:
performing an analysis on the index and the data based on the current scale parameter in the requested scale parameter, to obtain a current analysis result;
if the requested scale parameter includes a previously cached scale parameter,
performing an analysis on the index and the data based on the previously cached scale parameter in the requested scale parameter, to obtain a previous analysis result, and
determining data meeting the incremental condition in the current analysis result as the incremental data,
where the determining data meeting the incremental condition in the current analysis result as the incremental data includes: determining data which is in the current analysis result but not in the previous analysis result, as the incremental data;

if the requested scale parameter does not include the previously cached scale parameter, then using data in the current analysis result as the incremental data, and using the current scale parameter as a current highest-level scale parameter of the incremental data, sending the incremental data to the request sender.

An apparatus for processing data, including: a scale setting unit, a data analysis unit, and a data processing unit, the scale setting unit is configured to determine a scale of data. The scale of the data includes, but is not limited to, a preset scale, a temporarily set scale, and a calculated scale in data processing;

the data analysis unit is configured to analyze and calculate a relationship between the data based on the scale of the data; and the data processing unit is configured to process the data based on the relationship, with a processing method corresponding to a set processing type.

An apparatus for establishing an index and analyzing and managing data, including: a scale setting unit, a data analysis unit, and an index generation unit;

the scale setting unit is configured to determine a scale of data;

the data analysis unit is configured to analyze and calculate a relationship between the data based on the scale of the data; and the index generation unit is configured to establish an index, analyze and manage the data based on the analyzed and calculated relationship between the data.

An apparatus for managing and storing data, including: a set scale unit, a data analysis unit, and a management and storage unit.

the scale set unit is configured to determine a scale of data, where the scale of the data includes, but is not limited to, a preset scale, a temporarily set scale, and a scale calculated in processing the data; and the data analysis unit is configured to analyze and calculate a relationship between the data based on the scale of the data; and the management and storage unit is configured to manage and store the data based on the analyzed and calculated relationship between the data.

It can be seen from the technical solutions described above that, with the method for processing data according to the present disclosure, the performance bottlenecks of retrieval, reading, transmission, display, spatial relationship calculation, spatial analysis on data at a server, a transmission network and a client in processing massive data are effectively solved. By using the index, the unification between finiteness and infiniteness of data, between macroscopic and microscopic of data, and complexity and simplicity of data is achieved. With the index, the function and performance problems of retrieval, storage, reading, transmission, display, analysis and calculation, distributed management and operation of data are solved.

BRIEF DESCRIPTION OF THE DRAWINGS

The drawings to be used in the description of the embodiments or the conventional technology are described briefly as follows, so that the technical solutions in the embodiments of the present disclosure or the conventional technology are clearly illustrated. It is apparent that the drawings in the following description only illustrate some embodiments of the present disclosure. For those skilled in the art, other drawings may be obtained based on these drawings without any creative work.

DETAILED DESCRIPTION OF THE EMBODIMENTS

The technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the scope of the present disclosure.

A real or virtual object is expressed and described by data, and such expression and description have different scales, such as zooming in and out of data display, and resolution of a screen. Electronic screens (i.e., view windows) have different resolutions. When data is displayed in a view window, if an image rendered by the data is small in the view window, data representing details of the data will render on the same pixels, since the resolution of the view window is limited; and if the image rendered by the data is large in the view window, the details will be displayed. That is, a larger number of pixels filled (rendered) by the data indicates a higher resolution and a smaller scale of the data, and a smaller number of pixels filled (rendered) by the data indicates a lower resolution and a larger scale of the data. Therefore, there is a characteristic of multi-scale and multi-resolution in data displaying. However, the characteristic of multi-scale of the data is not recorded in current index, data management and storage, and all the data is transmitted and displayed in reading, transmitting, and displaying, resulting in a bottleneck in network transmission and a bottleneck in data rendering. If self-adaptive simplification is performed on the data, a calculation bottleneck will be caused for the server, as is the data analysis and calculation. Therefore, the above technical bottleneck problem is solved with an index according to the present disclosure.

Data in the embodiments of the present disclosure includes, but is not limited to, two-dimensional data, three-dimensional data, and multi-dimensional data.

Figure 1:
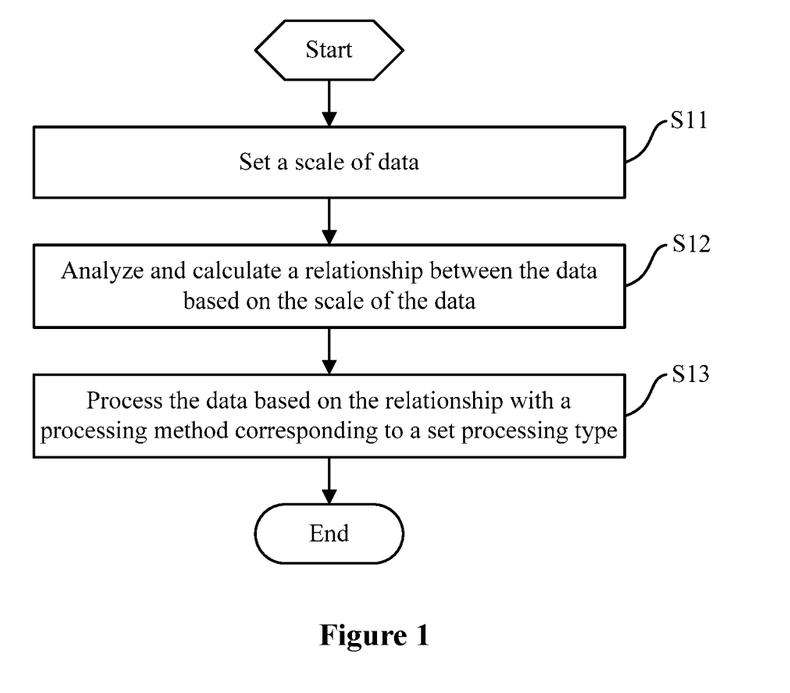
FIG. 1 is a flow chart of a method for processing data according to an embodiment of the present disclosure.

Reference is made to FIG. 1, which is a flow chart of a method for processing data according to an embodiment of the present disclosure. The method includes following steps S11 to S13.

In step S11, a scale of data is set.

The data includes, but is not limited to, a macro data set, data describing an object (such as surface data), coordinate data (such as coordinate points constituting the surface data), and a micro data bit (such as data in each of data bits constituting the coordinate data).

The scale of the data includes but is not limited to a spatial scale of the data and a time scale of the data.

The scale of the data is a variable representing macro and micro of the data. Data at a larger scale is more macroscopic than data at a smaller scale, while data at a smaller scale is more microscopic than data at a larger scale.

The scale of the data includes but is not limited to a scale of observed data, such as a magnification ratio of spatial data when the spatial data is displayed on a computer.

A spatial scale includes, but is not limited to, a resolution of the spatial data.

The set scale of the data includes, but is not limited to, a preset scale, a temporarily set scale, a calculated scale in data processing.

In step S12, a relationship between the data is analyzed and calculated based on the scale of the data.

The relationship between the data includes, but is not limited to, a spatial relationship, a time relationship, and a scale relationship.

The spatial relationship between data at a different scale shows a simple feature or a complex feature. For example, the spatial relationship between data at a large scale is simply a coincidence relationship or a non-coincidence relationship, and the spatial relationship between non-coincident data is simply an adjacent relationship or a separate relationship.

In step S13, the data is processed based on the relationship, with a processing method corresponding to a set processing type.

The data is processed based on the relationship, includes but is not limited to:
  index establishment, storage, reading, transmission, display, analysis of the data are performed based on relationships between data at different scales;
  and/or,
  index storage, reading, transmission, display, analysis of the data are performed based on different scales and relationships between data.

Figure 2:
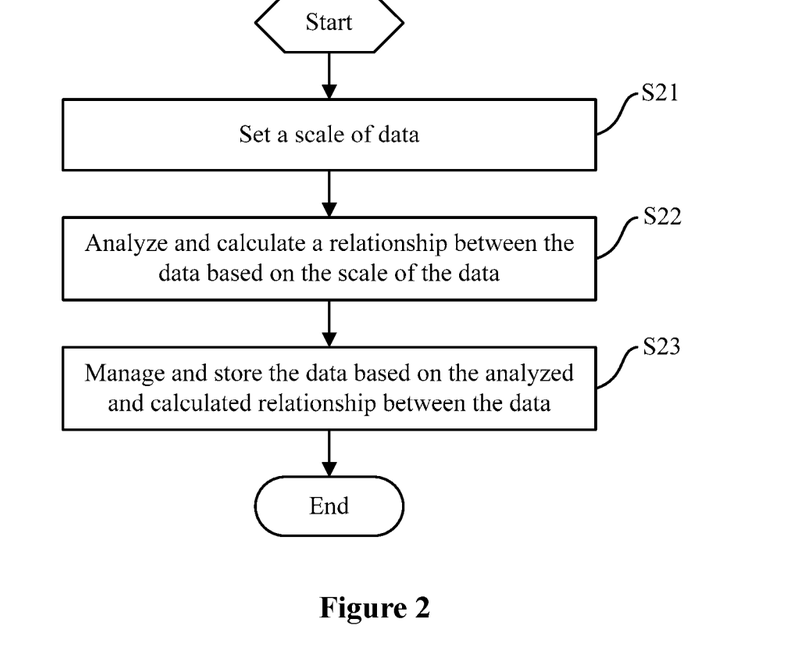
FIG. 2 is a flow chart of a method for managing and storing data according to an embodiment of the present disclosure.

Reference is made to FIG. 2, which is a flow chart of a method for managing and storing data according to an embodiment of the present disclosure. The method includes following steps S21 to S23.

In step S21, a scale of data is set.

An initial scale for data management is set based on simplicity of a relationship between data at different scales.

A scale at which the data is coincident is set to the initial scale for data management.

The data coincidence includes, but is not limited to, all data forms one coincidence, data forms multiple coincidences, and multiple coordinate points of one piece of data forms a coincidence.

In step S22, a relationship between the data is analyzed and calculated based on the scale of the data.

The relationship includes, but is not limited to, a coincidence relationship, an inclusion relationship, an intersection relationship, a tangency relationship, and a separation relationship.

In step S23, the data is managed and stored based on the analyzed and calculated relationship between the data.

The data between which the relationship is coincidence is used as a data management unit.

A new scale of the data is set based on the initial scale for data management.

The relationship between the data is analyzed and calculated based on the new scale of the data. If the relationship between the data is not just the coincidence relationship, but further includes a complex relationship such as the intersection relationship, the tangency relationship, the separation relationship, or the inclusion relationship, then the data is used as a data storage unit at the new scale.

Data, which meets a data management condition and between which the relationship is still the coincidence relationship, is used as a data management unit at the new scale, then another new scale of the data is set, and the above processing is repeated. The data management condition includes, but is not limited to, one or a combination of the number of data, an amount of data, and a range of data.

The range of data includes, but is not limited to, a display range of the data at the new scale.

Figure 3:
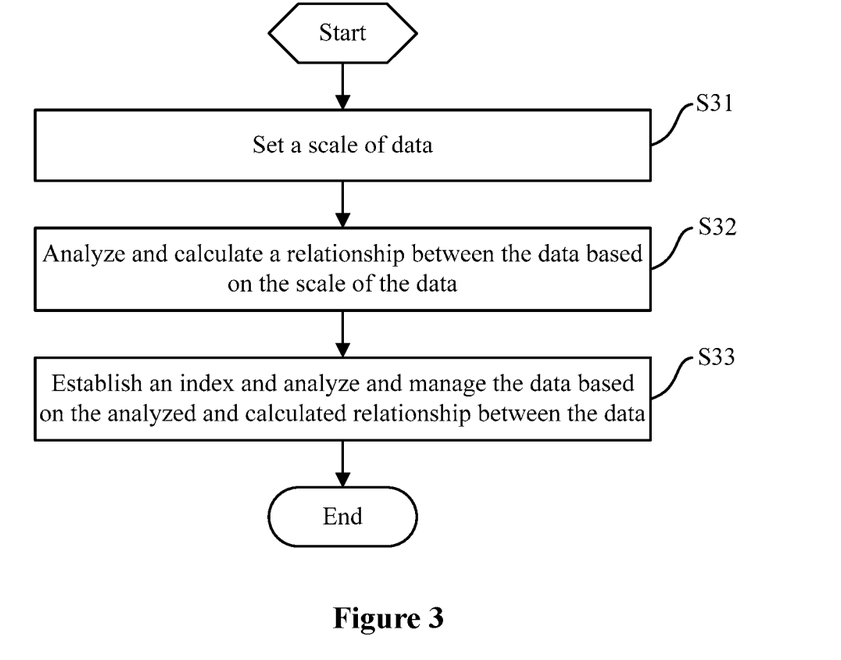
FIG. 3 is a flow chart of a method for establishing an index and analyzing and managing data according to an embodiment of the present disclosure.

Reference is made to FIG. 3, which is a flow chart of a method for establishing an index and analyzing and managing data according to an embodiment of the present disclosure. The method includes following steps S31 to S33.

In step S31, a scale of data is set.

The set scale of the data includes a scale in any case, such as a preset scale, a temporarily set scale, or a calculated scale in data processing.

A level of an index is determined based on the set scale of the data.

The data is managed and retrieved based on the determined level of the index.

In step S32, a relationship between the data is analyzed and calculated based on the scale of the data.

The relationship between the data includes, but is not limited to, a spatial relationship, a time relationship, and a scale relationship.

The spatial relationship between data at a different scale shows a simple feature or a complex feature. For example, the spatial relationship between data at a large scale is simply a coincidence relationship or a non-coincidence relationship, and the spatial relationship between non-coincident data is a simple relationship such as an adjacent relationship or a separate relationship.

In step S33, an index is established and the data is analyzed and managed based on the analyzed and calculated relationship between the data.

After performing the above two steps, the data may be processed based on the relationship with a processing method corresponding to a set processing type. For example, step S33 shows a way of processing data based on the relationship. The specific implementation process of steps S31 and S32 may refer to the embodiment shown in FIG. 1.

In this step, an index establishment condition may be determined based on a specific situation.

Cases of determining the index establishment condition based on a specific situation include: a case of setting a condition and a case of not setting a condition. For example, it is unnecessary to set the index establishment condition in establishing an index for data in each of data bits constituting coordinate data.

The index establishment condition includes, but is not limited to, one or a combination of a certain range of data, a certain amount of data, and a certain number of data.

The range of data includes, but is not limited to, a range of the data or a calculated range based on the set scale of the data.

Based on a preset index establishment condition, a next level of an index is continuously established for data meeting the preset index establishment condition and meeting a relationship between indexed data.

A next level of an index is not established for data not meeting the index establishment condition and not meeting the relationship between indexed data.

A next level of an index is continuously established for data which meets the index establishment condition and between which the relationship analyzed and calculated based on the set scale of the data is coincidence.

The next level of the index corresponds to a scale of data at a next level.

The scale of a next level of data is set with, but is not limited to, a direct or an indirect method, such as calculation based on a scale of a current level, and external assignment.

A next level of the index is continuously established for data meeting the index establishment condition and meeting the relationship between the indexed data, and the next level of the index is managed with an index item for index management in the index. A managed index can be retrieved with the index item for index management.

The data, not meeting the index establishment condition and not meeting the relationship between the indexed data, is managed with an index item for data management in the index. The data can be retrieved with the index item for data management.

A next level of the index is continuously established for data which meets the index establishment condition and of which coordinate points analyzed and calculated based on the set scale of the data coincide into one point.

Based on the set scale of the data, a unified index is established for any one or a combination of data including but not limited to data of a macro data set, data describing or expressing an object, data in a micro data bit (such as 21.345, where 4 is data in the second data bit after the decimal point).

The unified index is used for data analysis and management. The data analysis and management includes any one or a combination of storage, query, reading, transmission, display, analysis, and spatial relationship calculation of data.

The relationship between the data is analyzed and calculated based on the scale, the index is established based on the relationship between the data corresponding to the scale, and then the data is analyzed and managed based on the index, including solving the technical problem regarding to function and performance, such as storage, transmission, display and analysis of data.

Based on the embodiment shown in FIG. 3, after setting the scale of the data, analyzing and calculating the relationship between the data based on the scale of the data, and establishing the index and analyzing and managing the data based on the analyzed and calculated relationship between the data, subsequent processing may further be included based on the established index. A method for managing and storing data based on an established index is provided in an embodiment of the present disclosure. The method includes: managing and storing data based on an established index.

The specific process includes: using an index item for data management in the index as a unit for managing and storing data. The unit for managing and storing data may be used for managing and storing data in various forms including storing a data block, storing a record, or storing a file.

Figure 4:
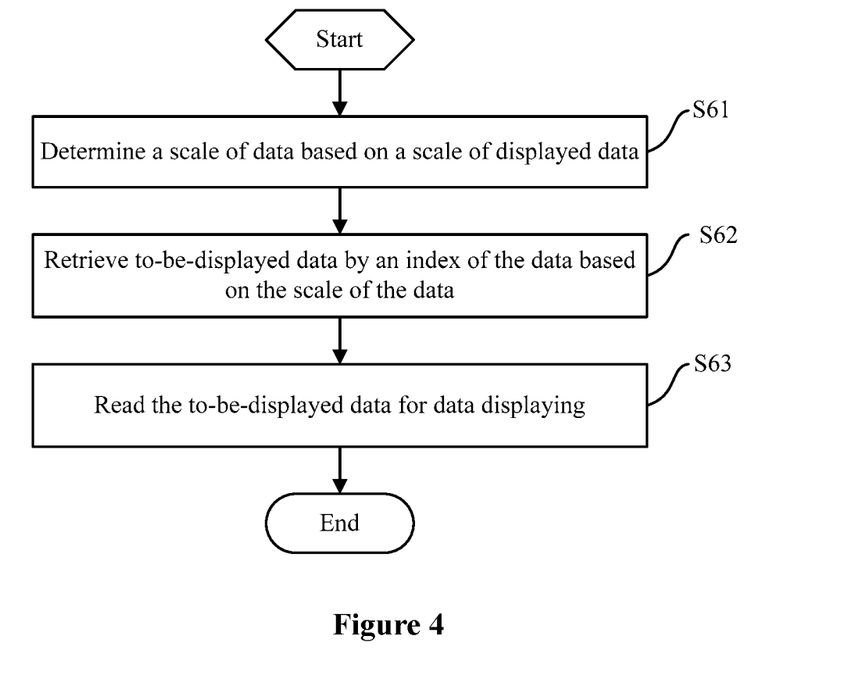
FIG. 4 is a flow chart of a method for displaying data according to an embodiment of the present disclosure.

In this step, the index item for data management in the index is used as an object for managing and storing data, and the object for managing and storing data may be managed and stored in various forms such as a data block, or a storage record, or as a storage file. Reference is made to FIG. 4, which is a flow chart of a method for displaying data according to an embodiment of the present disclosure. The method includes following steps S61 to S63.

In step S61, a scale of data is determined based on a scale of displayed data.

An index of the data is established based on a different scale, and the different scale reflects the macro and micro of the data.

The scale of the displayed data also reflects the macro and micro of the data.

A specific scale of the data may be directly corresponded to or calculated based on the scale of the display data, that is, the scale of the data is directly determined based on the display scale of the data, or the scale of the data is calculated based on the display scale of the data.

In step S62, to-be-displayed data is retrieved by an index of the data based on the scale of the data.

In the embodiment, the index of the data is established with the method according to the embodiments shown in FIGS. 1 to 3.

The retrieving to-be-displayed data by an index of the data based on the scale of the data includes one or multiple of following ways:

(1) using a retrieved index item for index management as display data for displaying, that is, at a scale of data correspond to the display scale of the data, data managed by the index item are displayed as a point;

(2) using part of data corresponding to the scale of the data in the retrieved data as the display data for displaying, that is, for the retrieved data at the scale of the data corresponding to the display scale of the data, part of the data can be displayed, other data cannot be displayed due to the coincidence between the data, and only the part of the data which can be displayed is used as the display data;

(3) using data in part of data bits corresponding to the scale of the data in the retrieved data as the display data for displaying, that is, for the retrieved data at the scale of the data corresponding to the display scale of the data, data in a part of data bits can be displayed, and only the data in the part of the data bits which can be displayed is used as the display data;

(4) using the retrieved data as the display data for displaying; and (5) using one or multiple pieces of the retrieved data to replace other data having a relationship of coincidence as the display data for displaying, that is, for the retrieved data at the scale of the data corresponding to the display scale of the data, only a part of the data can be displayed due to the coincidence relationship between the data, thus only the data which can be displayed is used as the display data for displaying.

In step S63, the to-be-displayed data is read for data displaying.

The reading includes reading from storage device of any data, such as a memory and a hard disk.

Based on step S62, an index data which can replace the data to be displayed and the data which can be displayed at the corresponding scale are read for displaying.

A method for analyzing and calculating data is provided in an embodiment of the present disclosure. In the embodiment, the analysis and calculation include: an analysis and calculation related to a scale, and an analysis and calculation unrelated to a scale.

The analysis and calculation includes, but is not limited to, spatial relationship calculation, aggregation analysis, or thermal map analysis of data.

Figure 5:
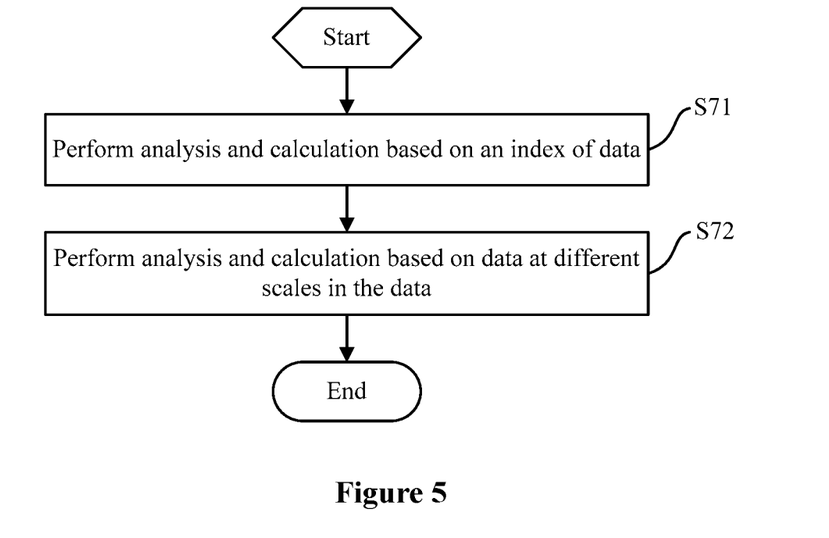
FIG. 5 is a flow chart of a method for analyzing and calculating data according to an embodiment of the present disclosure.

The analysis and calculation related to the scale is performed based on an index and data corresponding to the scale. FIG. 5 shows a flow chart of the method. The method includes following steps S71 to S72.

In step S71, an analysis and calculation is performed based on an index of data.

In the embodiment, the index of the data is established with the method according to the embodiments shown in FIGS. 1 to 3.

The analysis and calculation are performed based on a spatial relationship of index data in the index, at different scales.

It is determined, by performing analysis and calculation based on the index, that a relationship between the data includes, but is not limited to, there certainly have a spatial relationship, there certainly not have a spatial relationship, or there may have a spatial relationship.

If it is analyzed and calculated by the index that there is a spatial relationship of separation, inclusion, or intersection between data, there certainly have the spatial relationship of separation, inclusion, or intersection between data.

If it is analyzed and calculated by the index that there is a spatial relationship of coincidence or tangency between data, there may have a spatial relationship of coincidence, tangency, separation, or inclusion, and it is required to perform further analysis and calculation based on finer data, to confirm the relationship between the data.

The analysis and calculation includes, but is not limited to, performing an analysis and calculation at one or more of multiple parts of a system such as a client and a server.

The analysis and calculation includes, but is not limited to, performing the analysis and calculation based on the index and data at a macro scale at a non-data server such as a client part and an edge part of a system, and performing the analysis and calculation by using data at a micro scale and original data at a data storage end and a data service end.

In step S72, the analysis and calculation are performed based on data at different scales in the data.

The analysis and calculation are performed based on data at different scales in the data. Firstly, analysis and calculation are performed based on data at a certain scale corresponding to a small amount of data and a small amount of calculation. If it is required for performing the analysis and calculation that there certainly have a certain relationship between data, and if a result obtained by performing analysis and calculation based on data at a certain scale corresponding to a small amount of data and a small amount of calculation includes a result of might having the certain relationship, it is required to perform further analysis and calculation based on more data at a certain scale (that is, a more microscopic scale) in the data might having the certain relationship, until it is analyzed and calculated that there certainly have a certain spatial relationship between data.

If the result, obtained by performing the analysis and calculation based on data at a certain scale corresponding to a small amount of data and a small amount of calculation, is that there is a spatial relationship of separation, inclusion, or intersection between data, then there certainly have the spatial relationship of separation, inclusion, or intersection between data.

If the result, obtained by performing the analysis and calculation based on data at a certain scale corresponding to a small amount of data and a small amount of calculation, is that there is a spatial relationship of coincidence or tangency between data, there may have a spatial relationship of coincidence, tangency, separation, or inclusion between data, and it is required to perform further analysis and calculation based on finer data to confirm the relationship between the data.

Figure 6:
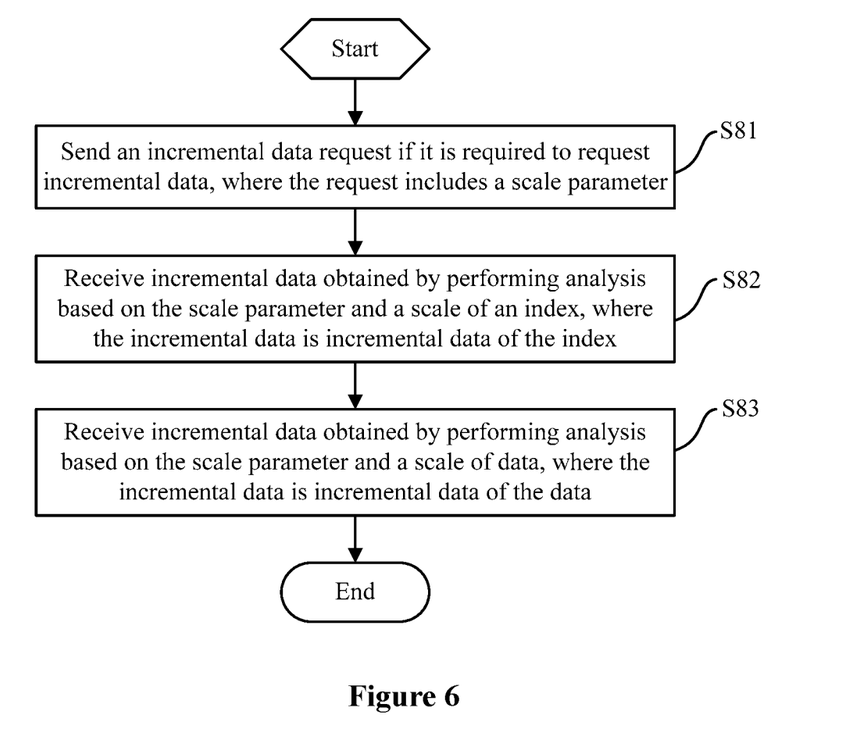
FIG. 6 is a flow chart of a method for progressively transmitting data according to an embodiment of the present disclosure.

Reference is made to FIG. 6, which is a flow chart of a method for progressively transmitting data according to an embodiment of the present disclosure. The method includes following steps S81 to S83.

In step S81, an incremental data request is sent if it is required to request incremental data. The request includes a scale parameter.

In the embodiment, the method for progressively transmitting data is applied to a request sender. When determining that it is required to request incremental data, the request sender sends the incremental data request to a request receiver, and the request includes a scale parameter.

If the request sender does not store a previously cached index, the requested scale parameter includes, but is not limited to, a current scale parameter.

If the request sender stores the previously cached index, the requested scale parameter includes, but is not limited to, the current scale parameter and a scale parameter corresponding to previously cached index data.

If the request sender stores the previously cached index and previously cached data, the requested scale parameter includes, but is not limited to, the current scale parameter and a scale parameter corresponding to the previously cached data.

An index item in the index for managing finer and more microscopic data corresponds to a higher level of the scale parameter.

Finer data and data having a higher resolution correspond to a higher level of the scale parameter.

The method for progressively transmitting data, in the case that the requested sender caches the previously cached data, includes following steps.

A current scale parameter is determined.

A highest-level scale parameter corresponding to the previously cached data is obtained.

A relationship between the highest-level scale parameter corresponding to the previously cached data and the current scale parameter is determined to determine whether it is required to request data, and subsequent steps are continuously performed if it is required to request the data, or the process is ended if it is unnecessary to request data.

The incremental data request is sent. The request includes, but is not limited to, the current scale parameter and the highest-level scale parameter corresponding to the previously cached data, which are called the requested scale parameter.

The previously cached data includes index data corresponding to a scale in a previously cached index and data corresponding to a scale in the previously cached data.

Then, the incremental data is obtained based on the requested scale parameter. This step includes at least the following two ways in steps S82 and S83.

In step S82, the incremental data obtained by performing analysis based on the requested scale parameter and a scale of the index is received. The incremental data is an incremental data of the index.

The incremental data obtained by performing analysis based on the requested scale parameter and the scale parameter of the index is received, where the incremental data is incremental data of the index. If previously cached index data exists, the received incremental data is inserted into the previously cached index data; and if the previously cached index data does not exist, the received incremental data is stored as cached data.

In step S83, the incremental data obtained by performing analysis based on the requested scale parameter and a scale of the data is received. The incremental data is an incremental data of the data.

The incremental data obtained by performing analysis based on the requested scale parameter and the scale parameter of the data is received, where the incremental data is incremental data of the data. If previously cached data exists, the received incremental data is inserted into the previously cached data; and if the previously cached data does not exist, the received incremental data is stored as cached data.

In the embodiment, step S82 or step S83 may be performed separately to obtain the incremental data, or the two steps may be both performed to obtain the incremental data. In the embodiment, the index of the data is established with the method according to the embodiments shown in FIGS. 1 to 3.

With the method for progressively transmitting data according to the embodiment, the requested scale parameter is included in the incremental data request sent by the request sender, so that the request receiver can obtain the incremental data by performing analysis based on the requested scale parameter, ensuring that the obtained incremental data can be displayed without loss, the data transmission amount is reduced and the data transmission efficiency is improved.

A method for progressively transmitting data is provided according to another embodiment of the present disclosure. The method is applied to a receiver for receiving an incremental data request. The method includes following steps.

An incremental data request sent from a request sender is received. The incremental data request includes a requested scale parameter.

Analysis is performed based on the requested scale parameter and a scale of an index, to determine index data meeting an incremental condition in the index as incremental data; and/or analysis is performed based on the requested scale parameter and a scale of data, to determine data meeting the incremental condition in the data as the incremental data.

Finally, the incremental data is sent to the request sender.

Figure 7:
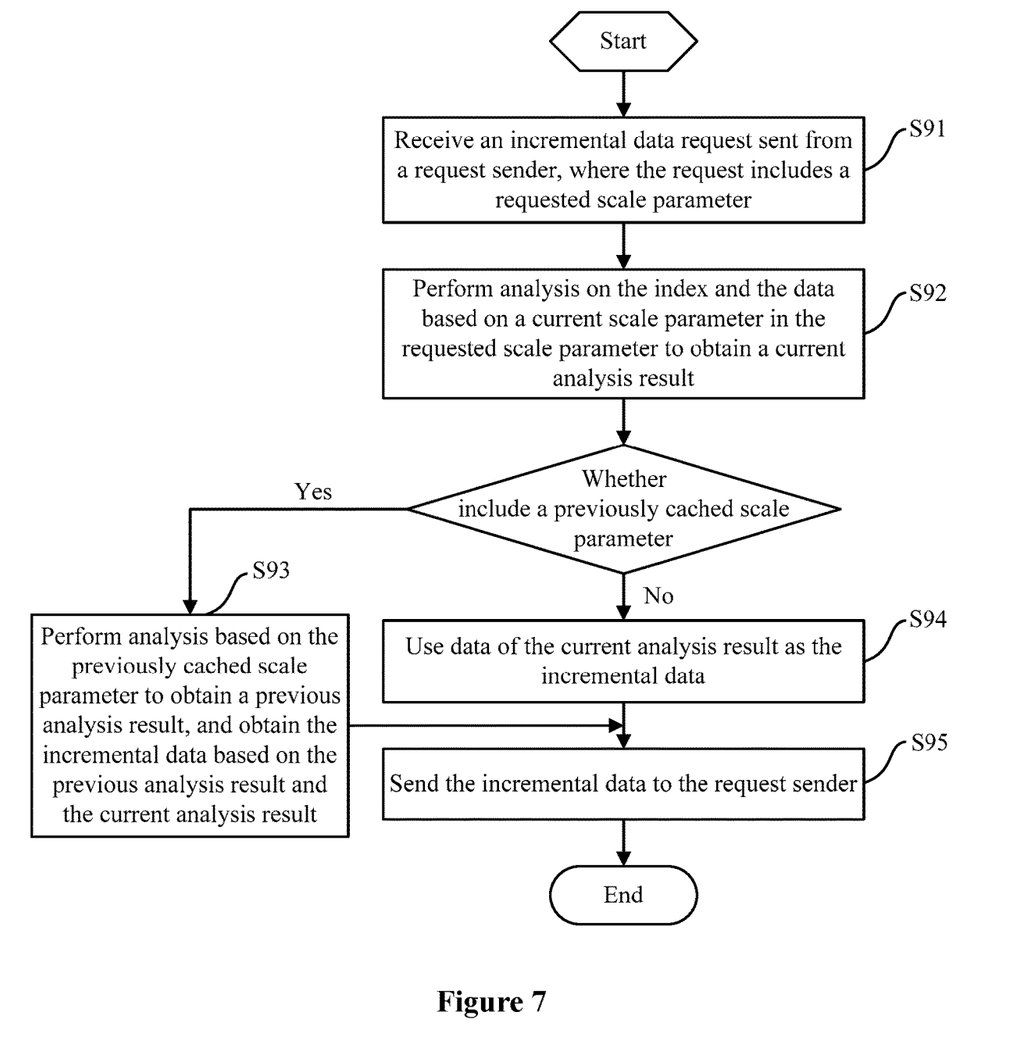
FIG. 7 is a flow chart of a method for progressively transmitting data according to another embodiment of the present disclosure.

In implementation, the process of obtaining the incremental data requested by the incremental data request is shown in FIG. 7, including following steps S91 to S95.

In step S91, an incremental data request sent from a request sender is received. The request includes a requested scale parameter.

If the requested scale parameter included in the request includes a previously cached scale parameter, it indicates that the request sender stores previously cached data.

In step S92, analysis is performed on the index and the data, based on a current scale parameter in the requested scale parameter, to obtain a current analysis result.

Data in the index, at a scale corresponding to the current scale parameter, is used as the current analysis result.

Data in the data, at a scale corresponding to the current scale parameter is used as the current analysis result.

If the requested scale parameter includes the previously cached scale parameter, step S93 is performed, and if the requested scale parameter does not include the previously cached scale parameter, step S94 is performed.

In step S93, analysis is performed on the index and the data based on the previously cached scale parameter in the requested scale parameter, to obtain a previous analysis result.

The determining data meeting the incremental condition in the current analysis result as the incremental data includes: determining the data, in the current analysis result and not in the previous analysis result, as the incremental data.

In step S94, the data of the current analysis result is used as the incremental data.

If the requested scale parameter does not include the previously cached scale parameter, the data of the current analysis result is used as the incremental data.

In step S95, the incremental data is sent to the request sender.

The current scale parameter is used as a current highest-level scale parameter of the incremental data.

The incremental data is sent to the request sender.

If the request sender caches the previously cached data, it is required to insert the received incremental data into the previously cached data, to realize data reconstruction, and the reconstructed data is used as current cached data.

If the request sender does not cache the previously cached data, the request receiver, after receiving the incremental data request, performs analysis on the data based on the current scale parameter in the requested scale parameter, and the obtained data is the incremental data. After receiving the incremental data, the request sender caches the incremental data as the previously cached data, for subsequent processing of progressive transmission.

In the embodiment, the index of the data is established with the method according to the embodiments shown in FIGS. 1 to 3.

Figure 8:
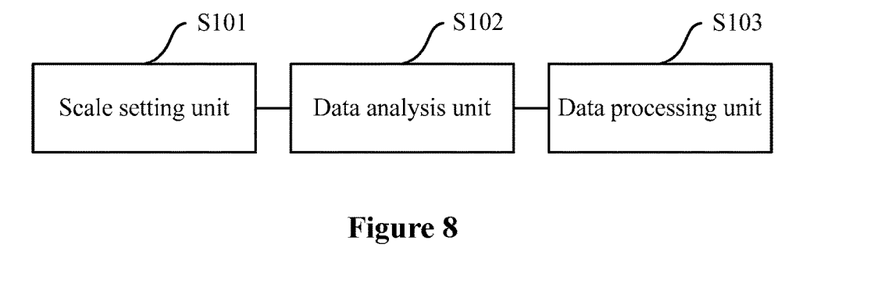
FIG. 8 is a schematic structural diagram of an apparatus for processing data according to an embodiment of the present disclosure.

An apparatus for processing data is provided in an embodiment of the present disclosure. FIG. 8 shows a structure of the apparatus. The apparatus includes: a scale setting unit 101, a data analysis unit 102, and a data processing unit 103.

The scale setting unit 101 is configured to determine a scale of data. The scale of the data includes, but is not limited to, a preset scale, a temporarily set scale, and a calculated scale in data processing.

The data analysis unit 102 is configured to analyze and calculate a relationship between the data based on the scale of the data.

The data processing unit 103 is configured to process the data based on the relationship with a processing method corresponding to a set processing type.

Only a better implementation of the apparatus for processing data is provided in the embodiment. The specific operating process of the apparatus may refer to any one of the processes shown in FIG. 1 to 7, which is not repeated herein.

Figure 9:
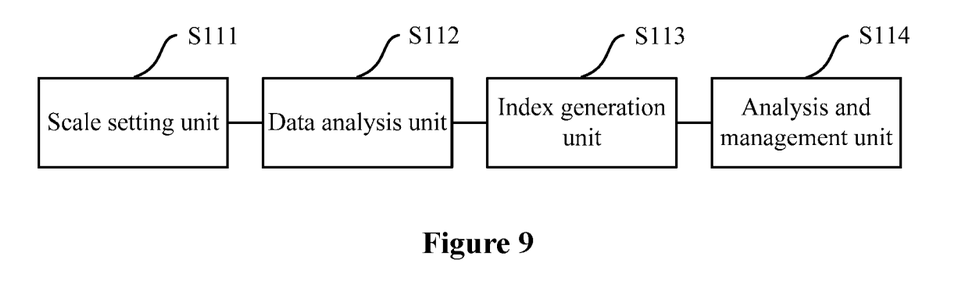
FIG. 9 is a schematic structural diagram of an apparatus for establishing an index and analyzing and managing data according to an embodiment of the present disclosure.

An apparatus for establishing an index and analyzing and managing data is provided in an embodiment of the present disclosure. FIG. 9 shows a structure of the apparatus. The apparatus includes: a scale setting unit 111, a data analysis unit 112, an index generation unit 113, and an analysis and management unit 114.

The scale setting unit 111 is configured to determine a scale of data. The scale of the data includes, but is not limited to, a preset scale, a temporarily set scale, and a calculated scale in data processing.

The data analysis unit 112 is configured to analyze and calculate a relationship between the data based on the scale of the data.

The index generation unit 113 is configured to establish an index, analyze and manage the data based on the analyzed and calculated relationship between the data.

The analysis and management unit 114 is configured to analyze and manage the data in storage, display, analysis and calculation, and progressive transmission, based on the index.

Alternatively, the index generation unit 113 may be configured to establish an index, analyze and manage the data based on the analyzed and calculated relationship between the data.

Only a better implementation of the apparatus for establishing an index and analyzing and managing data is provided in the embodiment. The specific operating processes of the apparatus may refer to any one of the processes shown in FIG. 3 to 7, which is not repeated herein.

Figure 10:
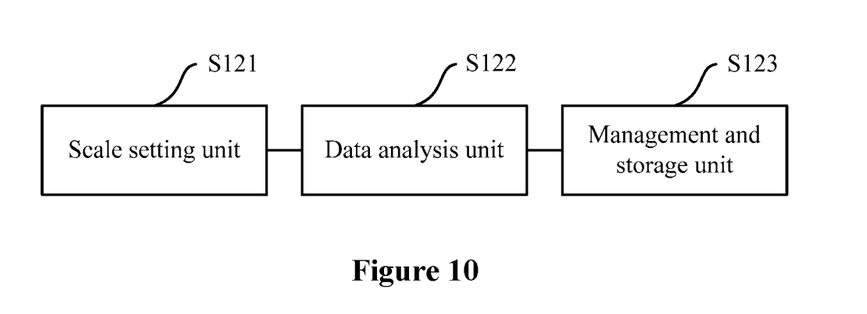
FIG. 10 is a schematic structural diagram of an apparatus for managing and storing data according to an embodiment of the present disclosure.

An apparatus for managing and storing data is provided in an embodiment of the present disclosure. FIG. 10 shows a structure of the apparatus. The apparatus includes: a scale setting unit 121, a data analysis unit 122, and a management and storage unit 123.

The scale setting unit 121 is configured to determine a scale of data. The scale of the data includes, but is not limited to, a preset scale, a temporarily set scale, and a calculated scale in data processing.

The data analysis unit 122 is configured to analyze and calculate a relationship between the data based on the scale of the data.

The management and storage unit 123 is configured to manage and store the data based on the analyzed and calculated relationship between the data.

Only a better implementation of the apparatus for managing and storing data is provided in the embodiment. The specific operating processes of the apparatus may refer to the process shown in FIG. 2, which is not repeated herein.

An apparatus for managing and storing data is further provided in another embodiment of the present disclosure. The apparatus includes a management and storage unit. The management and storage unit may be used in conjunction with the apparatus for establishing an index and analyzing and managing data shown in FIG. 9, to manage and store the data based on the index of the data obtained by the apparatus in FIG. 9. The specific operating processes of the apparatus may refer to the operating processes in the method embodiments, which is not repeated herein.

An apparatus for displaying data is provided in an embodiment of the present disclosure. The apparatus includes: a scale determination unit, a retrieval unit, and a data reading unit.

The scale determination unit is configured to determine a scale of data based on a scale of displayed data.

The retrieval unit is configured to retrieve to-be-displayed data by an index of the data based on the scale of the data.

The data reading unit is configured to read the to-be-displayed data for data displaying.

In the embodiment, the index of the data is generated by the apparatus for establishing an index and analyzing, and managing data shown in FIG. 9. The specific operating processes of the apparatus for displaying data may refer to the embodiment shown in FIG. 4, which is not repeated herein.

An apparatus for analyzing and calculating data is further provided in an embodiment of the present disclosure. The apparatus includes: an analysis and calculation unit.

The analysis and calculation unit is configured to perform analysis and calculation based on an index of data.

The analysis and calculation unit may be used in conjunction with the apparatus for establishing an index and analyzing and managing data shown in FIG. 9, to perform analysis and calculation based on the index of the data obtained by the apparatus in FIG. 9. The specific operating processes of the apparatus may refer to the operating processes in the method embodiments, which is not repeated herein.

An apparatus for progressively transmitting data is further provided in an embodiment of the present disclosure, applied to an incremental data request sender. The apparatus includes: an incremental data request sending unit and an incremental data receiving unit.

The incremental data request sending unit is configured to send an incremental data request if it is required to request incremental data. The request includes a requested scale parameter.

The incremental data receiving unit is configured to receive incremental data obtained by performing analysis based on the requested scale parameter and a scale of an index, where the incremental data is incremental data of the index, and/or, to receive incremental data obtained by performing analysis based on the requested scale parameter and a scale of data, where the incremental data is incremental data of the data.

In the embodiment, the index of the data is generated by the apparatus for establishing an index and analyzing and managing data shown in FIG. 9. The specific operating processes of the apparatus may refer to the embodiment shown in FIG. 6, which is not repeated herein.

In addition, an apparatus for progressively transmitting data is further provided in another embodiment of the present disclosure, applied to an incremental data receiver. The apparatus includes: an incremental data request receiver, an incremental data determination unit, and an incremental data sending unit.

The incremental data request receiver is configured to receive an incremental data request sent from a request sender. The incremental data request includes a requested scale parameter.

The incremental data determination unit is configured to perform analysis based on the requested scale parameter and a scale of an index, to determine index data meeting an incremental condition in the index as incremental data, and/or, to perform analysis based on the requested scale parameter and a scale of data, to determine data meeting the incremental condition in the data as the incremental data.

The incremental data sending unit is configured to send the incremental data to the request sender.

In the embodiment, the index of the data is generated by the apparatus for establishing an index and analyzing and managing data shown in FIG. 9. The specific operating processes of the apparatus may refer to the embodiment shown in FIG. 7, which is not repeated herein.

The method and the apparatus for processing data according to the present disclosure may be arranged in a computer, or in a mobile phone or other equipment.

The embodiments in this specification are described in a progressive way, each of which emphasizes the differences from others, and the same or similar parts among the embodiments can be referred to each other. Since the apparatus disclosed in the embodiments corresponds to the method therein, the description thereof is relatively simple, and for relevant matters references may be made to the description of the method.

It may be known by those skilled in the art that, units and algorithm steps in each examples described in conjunction with the embodiments disclosed herein can be realized by electronic hardware, computer software or a combination thereof. In order to clearly illustrate interchangeability of the hardware and the software, steps and composition of each embodiment have been described generally in view of functions in the above specification. Whether the function is executed in a hardware way or in a software way depends on application of the technical solution and design constraint condition. Those skilled in the art can use different method for each application to realize the described function, and this is not considered to be beyond the scope of the application.

The steps of the methods or algorithms described in conjunction with the embodiments of the present disclosure can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, CD-ROM, or other types of storage media well known in the technical field.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A method for processing data, comprising:
setting a scale of data;
analyzing and calculating a relationship between the data based on the scale of the data; and
processing the data based on the relationship with a processing method corresponding to a set processing type, wherein the processing the data based on the relationship with a processing method corresponding to a set processing type comprises: establishing an index and analyzing and managing the data based on the analyzed and calculated relationship between the data,
wherein the establishing an index and analyzing and managing the data based on the analyzed and calculated relationship between the data comprises:
continuously establishing a next level of the index for data meeting a preset index establishment condition and meeting an relationship between indexed data; and
not establishing a next level of the index for data not meeting the preset index establishment condition and not meeting the relationship between the indexed data.

2. The method according to claim 1, wherein
the data comprises any one or a combination of a macro data set, data describing an object, coordinate data, or a micro data bit, and
the scale of the data is a variable representing macro and micro of the data, data at a large scale is more macroscopic than data at a small scale, and the data at the small scale is more microscopic than the data at the large scale.

3. The method according to claim 1, wherein the scale of the data comprises a spatial scale of the data or a time scale of the data.

4. The method according to claim 1, wherein
the scale of the data comprises a scale of observed data or a scale of spatial data,
the scale of the observed data comprises a magnification ratio of the spatial data when the spatial data is displayed on a computer, and
the scale of the spatial data comprises a resolution of the spatial data.

5. The method according to claim 1, wherein the relationship between the data comprises any one or a combination of a spatial relationship, a time relationship, and a scale relationship.

6. The method according to claim 1, wherein the processing the data based on the relationship with a processing method corresponding to a set processing type comprises:
processing index establishment, storage, reading, transmission, display, analysis of the data based on a relationship between data at a different scale; or
processing index storage, reading, transmission, display, analysis of the data based on different scales and the relationship between the data.

7. A method for establishing an index and analyzing and managing data, comprising:
setting a scale of data;
analyzing and calculating a relationship between the data, based on the scale of the data; and
processing the data based on the relationship with a processing method corresponding to a set processing type, wherein the processing the data based on the relationship with a processing method corresponding to a set processing type comprises: establishing an index and analyzing and managing the data based on the analyzed and calculated relationship between the data,
wherein the establishing an index and analyzing and managing the data based on the analyzed and calculated relationship between the data comprises:
continuously establishing a next level of the index for data meeting a preset index establishment condition and meeting an relationship between indexed data; and
not establishing a next level of the index for data not meeting the preset index establishment condition and not meeting the relationship between the indexed data.

8. The method according to claim 7, wherein
the set scale of the data comprises a preset scale, a temporarily set scale, or a calculated scale in data processing,
a level of the index is determined based on the set scale of the data, and the data is managed and retrieved based on the determined level of the index.

9. The method according to claim 7, wherein the preset index establishment condition comprises: one or a combination of a predetermined range of data, a predetermined amount of data, and the predetermined number of data.

10. The method according to claim 9, wherein the range of data comprises: a range of the data itself or a range calculated based on the set scale of the data.

11. The method according to claim 7, wherein the establishing an index and analyzing and managing the data based on the analyzed and calculated relationship between the data comprises:
    continuously establishing a next level of the index for data meeting the index establishment condition and meeting the relationship between the indexed data, and managing the next level of the index with an index item for index management in the index, wherein a managed index is capable of being retrieved with the index item for index management; and
    managing the data not meeting the index establishment condition and not meeting the relationship between the indexed data with an index item for data management in the index, wherein the data is capable of being retrieved with the index item for data management.

12. The method according to claim 7, wherein the establishing an index and analyzing and managing the data based on the analyzed and calculated relationship between the data comprises:
    continuously establishing a next level of the index for data which meets the index establishment condition and between which the relationship analyzed and calculated based on the set scale of the data is coincidence,
    wherein the next level of the index corresponds to a scale of data at a next level, and
    the scale of data at the next level is set based on a scale of a current level or external assignment.

13. The method according to claim 12, wherein the establishing an index and analyzing and managing the data based on the analyzed and calculated relationship between the data comprises:
    continuously establishing a next level of the index for data which meets the index establishment condition and of which coordinate points analyzed and calculated based on the set scale of the data coincide into one point.

14. The method according to claim 7, comprising:
    establishing a unified index for any one or a combination of data in a data set, data describing or expressing an object, or data in a micro data bit based on the set scale of the data; and
    using the unified index for data analysis and management, wherein the data analysis and management comprises any one or a combination of storage, query, reading, transmission, display, analysis, and spatial relationship calculation of data.

15. A method for managing and storing data, comprising:
    managing and storing data based on an established index, wherein the index is established with the method according to claim 7.

16. The method according to claim 15, wherein the managing and storing data based on an established index comprises:
    using the index item of the index for data management as an object for managing and storing data, and performing data management and storage on the object for managing and storing data in a form including storing a data block, storing a record, or storing a file.

17. A method for managing and storing data, comprising:
    setting a scale of data;
    analyzing and calculating a relationship between the data based on the scale of the data; and
    managing and storing the data based on the analyzed and calculated relationship between the data,
    the method further comprising establishing an index and analyzing and managing the data based on the analyzed and calculated relationship between the data,
    wherein the establishing an index and analyzing and managing the data based on the analyzed and calculated relationship between the data comprises:
    continuously establishing a next level of the index for data meeting a preset index establishment condition and meeting a relationship between indexed data; and
    not establishing a next level of the index for data not meeting the preset index establishment condition and not meeting the relationship between the indexed data.

18. The method according to claim 17, wherein the setting a scale of data comprises:
    setting an initial scale for data management based on simplicity of a relationship between data at different scales.

19. The method according to claim 18, wherein the setting a scale of data comprises:
    setting a scale at which the data is coincident to the initial scale for data management, wherein the data coincidence comprises: all data forming one coincidence, data forming a plurality of coincidences, or a plurality of coordinate points of one piece of data forming a coincidence.

* * * * *